United States Patent
Becker Hof et al.

(10) Patent No.: US 7,505,472 B1
(45) Date of Patent: Mar. 17, 2009

(54) METHOD AND APPARATUS FOR AGNOSTIC PPP SWITCHING

(75) Inventors: Onno Mark Becker Hof, Zoetermeer (NL); Said Ouissal, Amsterdam (NL)

(73) Assignee: Redback Networks Inc., San Jose, CA (US)

( * ) Notice: Subject to any disclaimer, the term of this patent is extended or adjusted under 35 U.S.C. 154(b) by 926 days.

(21) Appl. No.: 10/600,192

(22) Filed: Jun. 20, 2003

(51) Int. Cl.
  *H04L 12/56* (2006.01)
(52) U.S. Cl. ............................ 370/401; 370/466
(58) Field of Classification Search ................. None
  See application file for complete search history.

(56) References Cited

U.S. PATENT DOCUMENTS

| | | | |
|---|---|---|---|
| 6,765,881 B1* | 7/2004 | Rajakarunanayake | 370/256 |
| 7,032,012 B2* | 4/2006 | Roh | 709/220 |
| 7,039,049 B1* | 5/2006 | Akgun et al. | 370/389 |
| 7,099,944 B1* | 8/2006 | Anschutz et al. | 709/227 |
| 7,103,001 B1* | 9/2006 | Cordsmeyer et al. | 370/241 |
| 7,173,932 B2* | 2/2007 | Miki et al. | 370/389 |
| 7,386,010 B2* | 6/2008 | Solomon et al. | 370/466 |
| 2001/0044893 A1* | 11/2001 | Skemer | 713/153 |
| 2003/0131133 A1* | 7/2003 | Nyu et al. | 709/245 |
| 2004/0001496 A1* | 1/2004 | Yusko et al. | 370/401 |
| 2004/0044789 A1* | 3/2004 | Angel et al. | 709/238 |
| 2004/0052263 A1* | 3/2004 | Xu | 370/399 |
| 2004/0071133 A1* | 4/2004 | Yusko et al. | 370/356 |

OTHER PUBLICATIONS

A Method for Transmitting PPP Over Ethernet (PPPoE), Network Working Group, Request for Comments: 2516, Category: Informational, by L. Mamakos, K. Lidl, J. Evarts, Uunet Technologies, Inc., D. Carrel, D. Simone, Redback Networks, Inc., R. Wheeler, RRouterWare, Inc., Feb. 1999 (17 pages).

* cited by examiner

*Primary Examiner*—Chi H. Pham
*Assistant Examiner*—Soon D. Hyun
(74) *Attorney, Agent, or Firm*—Blakely, Sokoloff Taylor & Zafman, LLP

(57) ABSTRACT

A method and apparatus for agnostic PPPoE switching is described. A method in a network element comprises converting Point to Point Protocol (PPP) protocol data units (PDUs) encapsulated according to different protocols into PPP PDUs with a uniform encapsulation, and transmitting the uniformly encapsulated PPP PDUs.

18 Claims, 8 Drawing Sheets

METHOD AND APPARATUS FOR AGNOSTIC PPP SWITCHING

BACKGROUND OF THE INVENTION

1. Field of the Invention

The invention relates to the field of communication. More specifically, the invention relates to communication networks.

2. Background of the Invention

Numerous protocols have been defined for carrying traffic over networks. Each of these protocols occupies a different level or levels of the OSI reference model and have distinguishable capabilities. For example, the Point to Point Protocol provides the facilities of the Link Control Protocol (LCP), network layer control protocols, authentication, etc. PPP also brings valuable functionality with respect to accounting and billing. The Ethernet protocol is probably the most generic and useable framing protocol in data communications. Ethernet frames can be carried over many different media or tunnel types.

The Request for Comments (RFC) 2516 defines the Point to Point Protocol over Ethernet (PPPoE). PPPoE enables delivery of traffic with Ethernet while maintaining the functionality of PPP. Typically networks carrying traffic from subscribers (e.g., homes users, telecommuters, corporations, etc.) utilize PPPoE or PPP over ATM (PPPoA). Aggregating diverse traffic types is inefficient. The upstream media type must be considered and possible solutions and value adds are limited.

BRIEF SUMMARY OF THE INVENTION

A method and apparatus for agnostic PPPoE switching is described. According to one aspect of the invention, a method in a network element provides for converting Point to Point Protocol (PPP) protocol data units (PDUs) encapsulated according to different protocols into PPP PDUs with a uniform encapsulation, and transmitting the uniformly encapsulated PPP PDUs.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
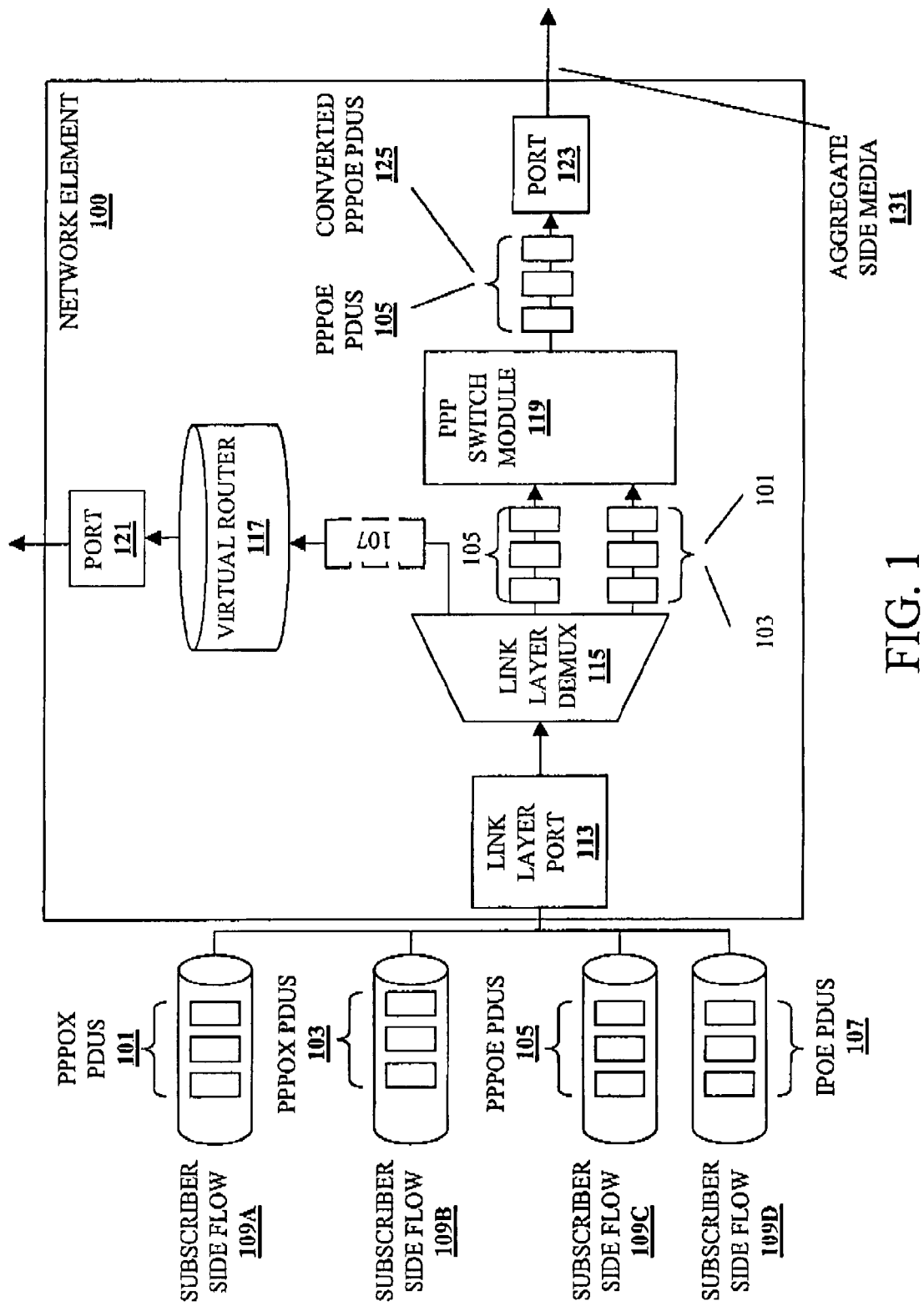
FIG. 1 is conceptual diagram illustrating an example of PPPoE switching according to one embodiment of the invention.

FIG. 1 is conceptual diagram illustrating an example of PPPoE switching according to one embodiment of the invention. In FIG. 1, a network element 100 is configured to receive traffic over subscriber side flows 109A-109D. The subscriber side flows 109A-109D may be ATM circuits, Frame Relay circuits, etc. The subscriber side flows 109A and 109B respectively carry PPPoX protocol data units (PDUs) 101 and 103. The "X" in PPPoX is a wildcard for the encapsulating protocol (e.g., GRE, ATM, MPLS, etc.), so PPPoX may be PPP over MPLS, PPP over GRE, PPP over ATM, etc. The subscriber side flow 109C carries PPPoE PDUs 105. The subscriber side flow 109D carries IPoE PDUs 107. In FIG. 1, the subscriber side flows are received via a link layer port 113 on the network element 100. The link layer port 113 is a logical port configured for a link layer protocol that corresponds to a physical port. In different scenarios, the subscriber side flows 109A-109D may be received via multiple link layer ports, multiple physical ports, a single link layer port configured for multiple physical ports, etc The link layer port 113 processes header information for the relevant link layer protocol of the PDUs 101, 103, 105 and 107. The PDUs 101, 103, 105 and 107 then flow to a link layer demultiplexer (demux) 115. The link layer demux 115 separates the flow of PDUs according to their encapsulation. The flow of PPPoX PDUs 101 and 103 are passed to a PPP switch module 119 separately from the flow of PPPoE PDUs 105, which are also passed to the PPP switch module 119. The link layer demux 115 passes the flow of IpoE PDUs 107 to a virtual router 117. The virtual router 117 processes the flow of IPoE PDUs 107 and forwards the flow of IPoE PDUs 117 out a port 121. The network element 100 is not limited to passing IPoE PDUs to the virtual router, a specific PDU has been selected to aid in the understanding of the invention and not meant to be limiting upon the invention. Different flows of PDUs (e.g., IPoA, IPoMPLS, etc.) may pass from the link layer demux 115 to the virtual router 117.

The PPP switch module 119 establishes PPPoE sessions for each flow of PDU that it receives. The PPP switch module 119 coverts the PPPoX PDUs 101 and 103 into PPPoE PDUs 125. The PPP switch module 119 then transmits the PPPoE PDUs 105 and the converted PPPoE PDUs 125 out of a port 123 (e.g., a Gigabit Ethernet port) along an aggregator side media 131 (e.g., Ethernet, GigE, GRE, MPLS, ATM, Packet over Sonet, L2TP, etc.).

Switching PPPoX and PPPoE traffic enables the PPPoX and PPPoE traffic to be transmitted over a single media (i.e., enables the switching network element to be media agnostic with relation to transmission of the PPPoX and PPPoE traffic). In addition, the switching network element becomes agnostic of the encapsulation the subscriber side, thus providing more flexibility for traffic manipulation for services and increased efficiency and performance. For example, the PPPoX and PPPoE traffic can all be converted to PPPoE traffic and transmitted over GigE media which provides faster transmission at a relatively lower cost than other medias.

Figure 2:
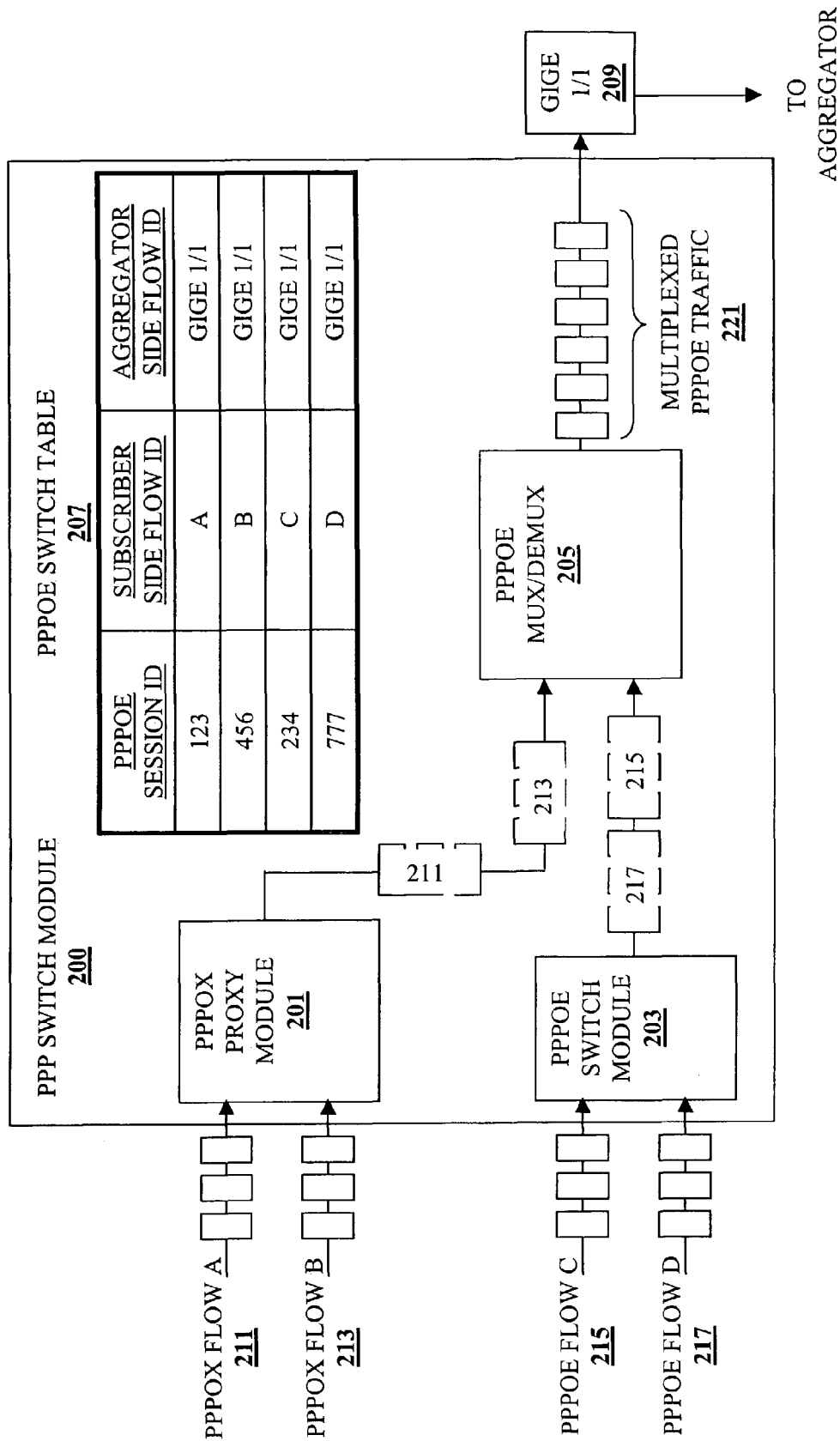
FIG. 2 is a conceptual diagram illustrating an exemplary PPP switch module according to one embodiment of the invention.

FIG. 2 is a conceptual diagram illustrating an exemplary PPP switch module according to one embodiment of the invention. In FIG. 2, a PPP switch module 200 includes a PPPoX proxy module 201, a PPPoE switch module 203, a PPPoE Multiplexer/Demultiplexer (Mux/Demux) 205, and a PPPoE switch table 207. The term "table" in PPPoE switching table is not meant to limit the PPPoE switching table to a table structure. The PPPoE switching table can be implemented with a variety of data structures (e.g., a multi-dimensional array, a tree, a hash table, etc.). The PPPoX proxy module 201 receives a PPPoX flow A 211 and a PPPoX flow B 213. The PPPoX proxy module 201 acts as a PPPoE proxy for each of the PPPoX flows 211 and 213. The PPPoX proxy module 201 converts the PDUs of the PPPoX flows 211 and 213 from PPPoX to PPPoE in accordance with the PPP switching table 207. The PPPoX proxy module 201 uses the appropriate PPPoE session identifier for the flows 211 and 213 as indicated in the PPP switching table 207. The destination MAC address used in the Ethernet headers of converted PDUs is predefined. In alternative embodiments of the invention, a MAC address to be indicated in Ethernet headers of converted PDUs is indicated in the PPP switching table. While in one embodiment of the invention a single MAC destination address is used, alternative embodiments of the invention the PPP switching table designates different MAC destination addresses for different flows of traffic.

The PPPoE mux/demux module 205 multiplexes the PPPoE flows 217 and 215 and the flows converted from the PPPoX flows 211 and 213, and transmits them as multiplexed PPPoE traffic 221 out of the GigE port 209 in accordance with the PPP switching table 207. Although FIG. 2 illustrates the PPP switching table 207 as indicating the same aggregator side flow identifier for all subscriber side flows received by the PPP switching module 200, the PPP switching table 207 may indicate different aggregator side flows for different subscriber side flows.

Figure 3:
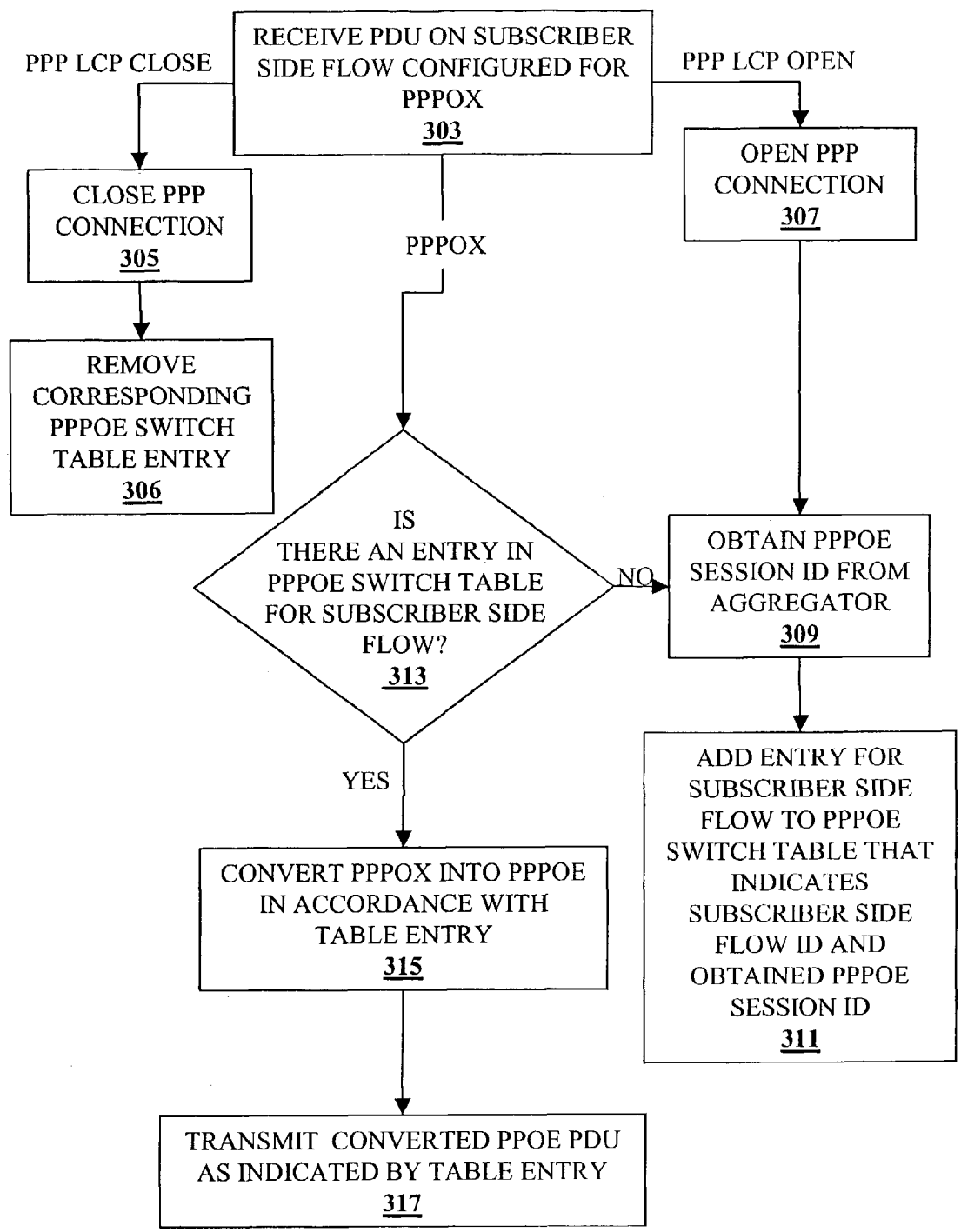
FIG. 3 is an exemplary flowchart for populating a PPPoE switching table for a PPPoX subscriber side flow according to one embodiment of the invention.

FIG. 3 is an exemplary flowchart for populating a PPPoE switching table for a PPPoX subscriber side flow according to one embodiment of the invention. At block 303, a PDU is received on a subscriber side flow, which has been configured for PPPoX. If the received PDU is a PPP LCP Close PDU then control flows to block 305. If the received PDU is a PPP LCP Open PDU, then control flows to block 307. If the received PDU is a PPPoX PDU, then control flows to block 313.

At block 307, a PPP connection is opened between a subscriber and the receiving network element. At block 309, a PPPoE session identifier is obtained from the aggregator in accordance with PPPoE. At block 311, an entry for the subscriber side flow that indicates the subscriber side flow identifier and the obtained PPPoE session identifier is added to the PPPoE switching table.

At block 305, the PPP connection between the subscriber and the receiving network element is closed. At block 306, an entry, which corresponds to the subscriber side flow, in the PPPoE switching table is removed.

At block 313, it is determined if there is an entry in the PPPoE switching table for the subscriber side flow. If there is not an entry in the PPPoE switching table for the subscriber side flow the control flows to block 309. If there is an entry in the PPPoE switching table for the subscriber side flow, then control flows to block 315.

At block 315, the PDU is converted from PPPoX into PPPoE in accordance with the table entry (i.e., the appropriate PPPoE session identifier is used for the Ethernet header, the correct MAC destination address is used, etc.). At block 317, the converted PDU is transmitted in accordance with the entry in the PPPoE switching table (e.g., the PDU is processed for transmission over GigE, the PDU is encapsulated according to MPLS, the PDU is encapsulated according to GRE, etc.).

Figure 4:
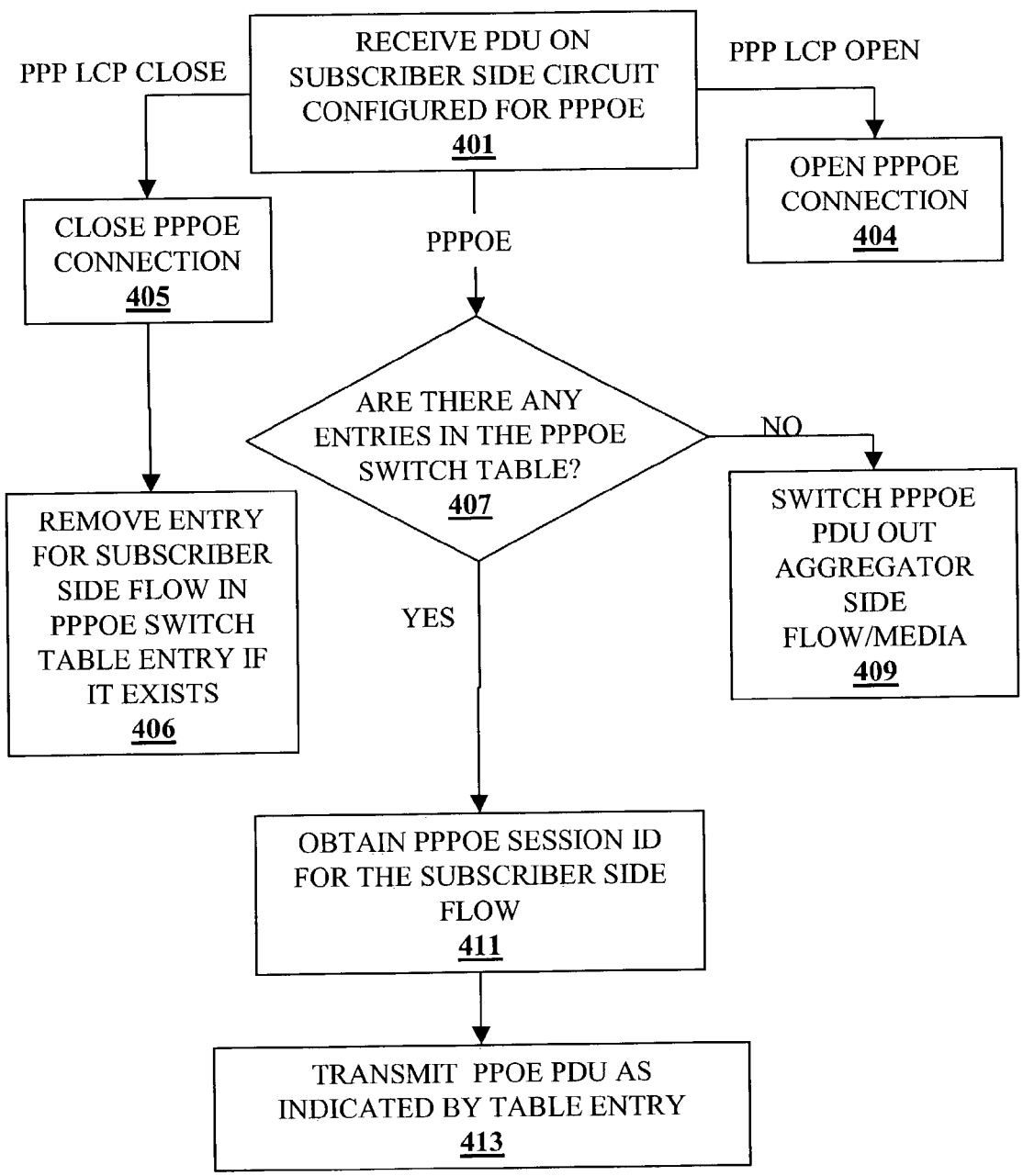
FIG. 4 is an exemplary flowchart for populating a PPPoE switching table for a PPPoE subscriber side flow according to one embodiment of the invention.

FIG. 4 is an exemplary flowchart for populating a PPPoE switching table for a PPPoE subscriber side flow according to one embodiment of the invention. At block 401, a PDU is received on a subscribed side flow that has been configured for PPPoE. If the received PDU is a PPP LCP Close PDU then control flows to block 405. If the received PDU is a PPP LCP Open PDU, then control flows to block 404. If the received PDU is a PPPoE PDU, then control flows to block 407.

At block 404, a PPPoE session is opened between a subscriber and the receiving network element.

At block 405, the PPPoE session is closed. At block 406, an entry for the subscriber side flow in a PPPoE switching table is removed, if it exists.

At block 407, it is determined if there are any entries in the PPPoE switching table. If it is determined that there are no entries in the PPPoE switching table, then control flows to block 409. If there is an entry in the PPPoE switching table, then control flows to block 411. In one embodiment of the invention, there are entries in the PPPoE switching table with information that has been configured, but there are no entries in the PPPoE switching table that indicate subscriber side flow identifiers, which is considered as no entries in the PPPoE switching table. In an alternative embodiment of the invention, a PPPoE switching table is not created until the PPPoX proxy module attempts to create an entry in the PPPoE switching table. Once a request to create an entry for a subscriber side flow is submitted, the PPPoE switching table is instantiated. In another embodiment of the invention, the PPPoE switching table is populated with configuration information, including subscriber side flow identifiers. In such an embodiment, the PPPoE switching table is modified to indicate that a subscriber side flow is active once a PPP session is opened or when a PDU is received on the subscriber side flow. This indication can be a separate field within the PPPoE switching table, a special bit set in the subscriber side flow identifier field, etc.

At block 409, the PPPoE PDU is switched out of the aggregator side flow/media.

At block 411, a PPPoE session identifier is obtained for the subscriber side flow. At block 413, the PPPoE PDU is transmitted in accordance with the entry in the PPPoE switching table.

Figure 5:
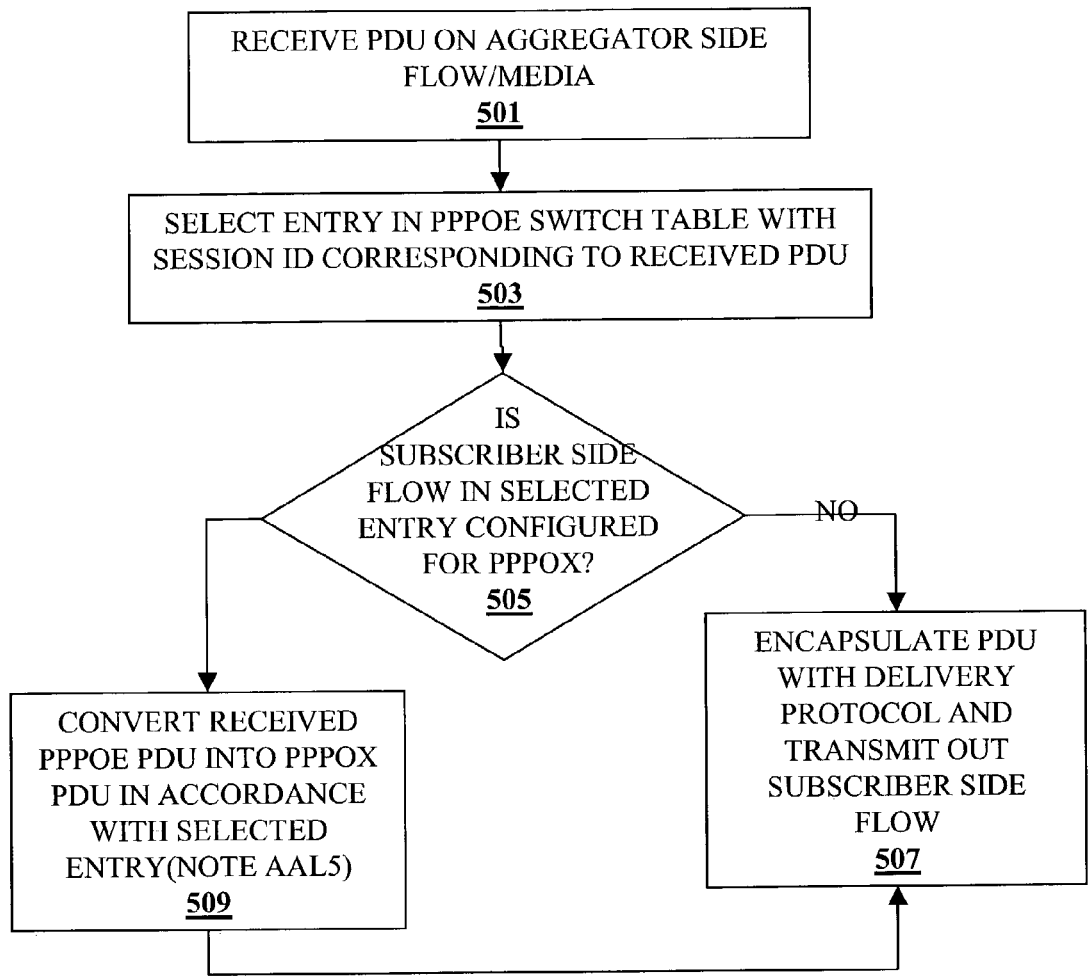
FIG. 5 is an exemplary flowchart for processing a PDU received on an aggregator side flow/media according to one embodiment of the invention.

FIG. 5 is an exemplary flowchart for processing a PDU received on an aggregator side flow/media according to one embodiment of the invention. At block 501, a PDU is received on an aggregator side flow/media. At block 503, an entry in the PPPoE switching table that corresponds to the received PDU is selected (i.e., the entry that indicates the PPPoE session identifier that is indicated in the received PDU is selected). At block 505, it is determined if the subscriber side flow in the selected entry is configured for PPPoX. If the subscriber side flow of the selected entry is not configured for PPPoX, then control flows to block 507. If the subscriber side flow in the selected entry is configured for PPPoX, then control flows to block 509.

At block 507, the PDU is encapsulated with a delivery protocol and transmitted out the subscriber side flow.

At block 509, the received PPPoE PDU is converted into a PPPoX PDU in accordance with the selected entry (e.g., AAL5). From block 509 control flows to block 507.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). For example, referring to FIG. 3 at block 306 and FIG. 4 at block 406, the entry may be marked as closed instead of removed.

Figure 6:
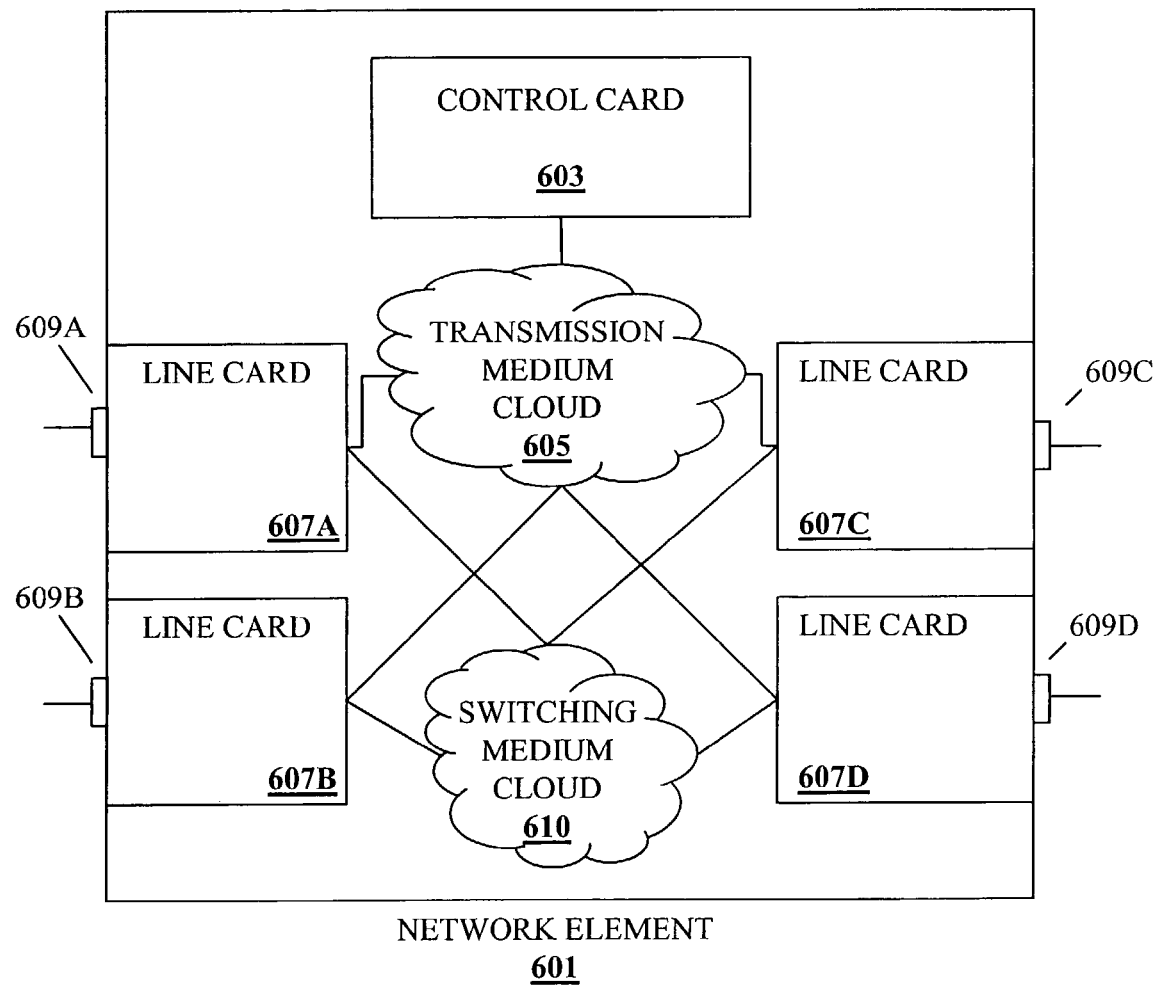
FIG. 6 is a diagram illustrating an exemplary network element according to one embodiment of the invention.

FIG. 6 is a diagram illustrating an exemplary network element according to one embodiment of the invention. In FIG. 6, A network element 601 includes a control card 603, a transmission medium 605, line cards 607A-607D, and physical ports 609A-609D. The control card 603 is coupled with the transmission medium 605 (e.g., a system bus). The transmission medium 605 is coupled with the line cards 607A-607D. The transmission medium 605 carries configuration information from the control card 603 to the line cards 607A-607D. One or more of the line cards 607A-607D host a PPPoE switching table. The line cards 607A-607D are coupled with each other via the switching medium 610. The switching medium may be a separate switching unit including hardware and/or software to determine which line card to forward traffic. Alternatively, the switching medium may be a mesh. Each of the line cards 607A-607D is respectively coupled with the physical ports 609A-609D. The ports 609A-609D may be ATM ports, GigE ports, Frame Relay ports, etc.

The control card and line cards illustrated in FIG. 6 include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Figure 7:
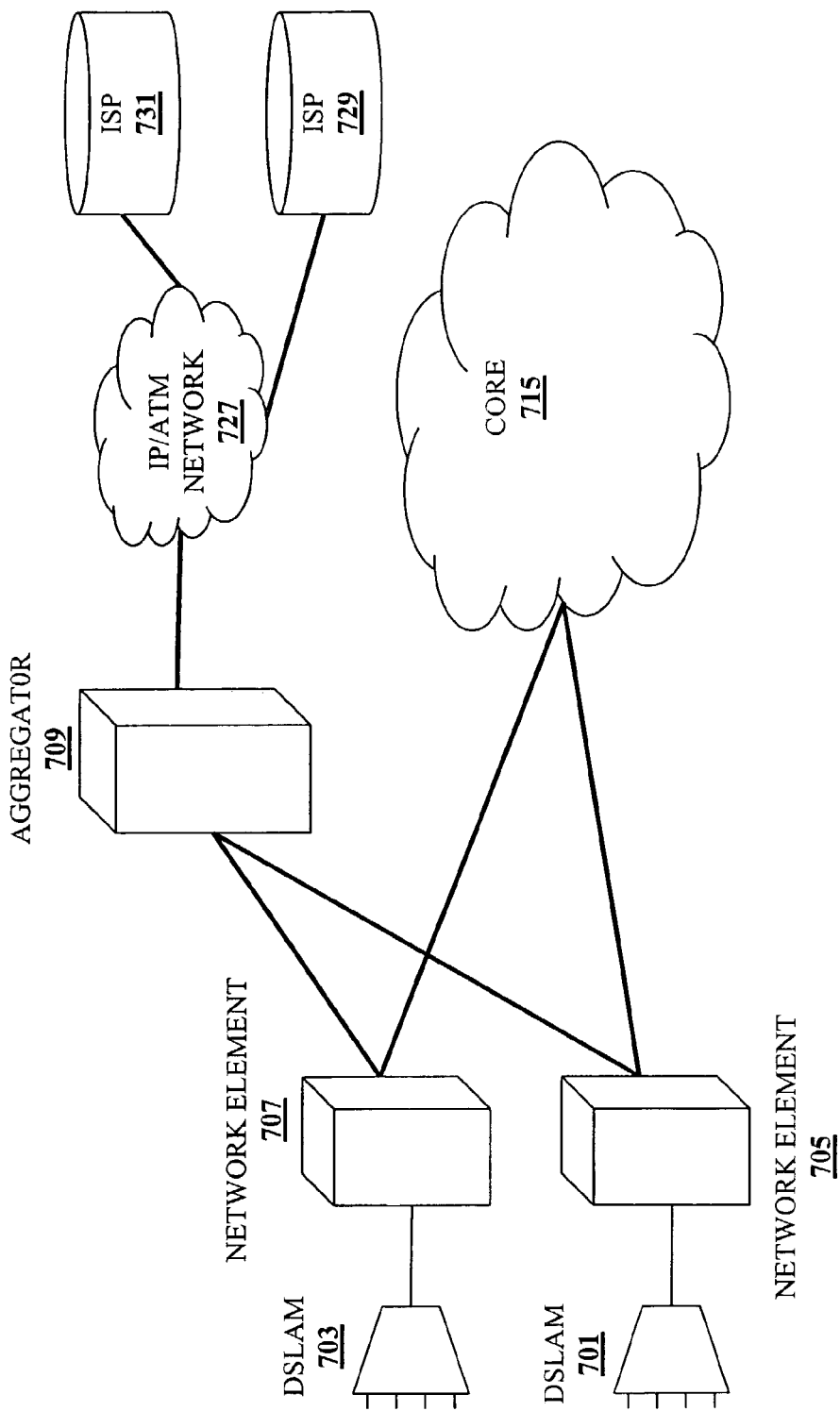
FIG. 7 is a diagram illustrating an example network utilizing agnostic PPPoE switching according to one embodiment of the invention

FIG. 7 is a diagram illustrating an example network utilizing agnostic PPPoE switching according to one embodiment of the invention. A DSLAM 703 transmits subscriber traffic over subscriber side flows to a network element 707. A DSLAM 701 transmits traffic from subscribers over subscriber side flows to a network element 705. The network elements 705 and 707 switch PPPoX traffic and PPPoE traffic from the DSLAMs 701 and 703 to an aggregator 709. The aggregator terminates PPPoE sessions and forwards to the traffic through an IP/ATM network cloud 727. Some of the subscriber traffic from the aggregator will flow to an Internet Service Provider (ISP) 729 while other subscriber traffic from the aggregator will flow to an ISP 731. Other subscriber traffic, such as IPoE or RFC 1483 traffic, is terminated at the network elements 705 and/or 707 and forwarded to a core network cloud 715. Multiple major points of presence (PoPs) can be efficiently designed in this manner with agnostic PPPoE switching.

Figure 8:
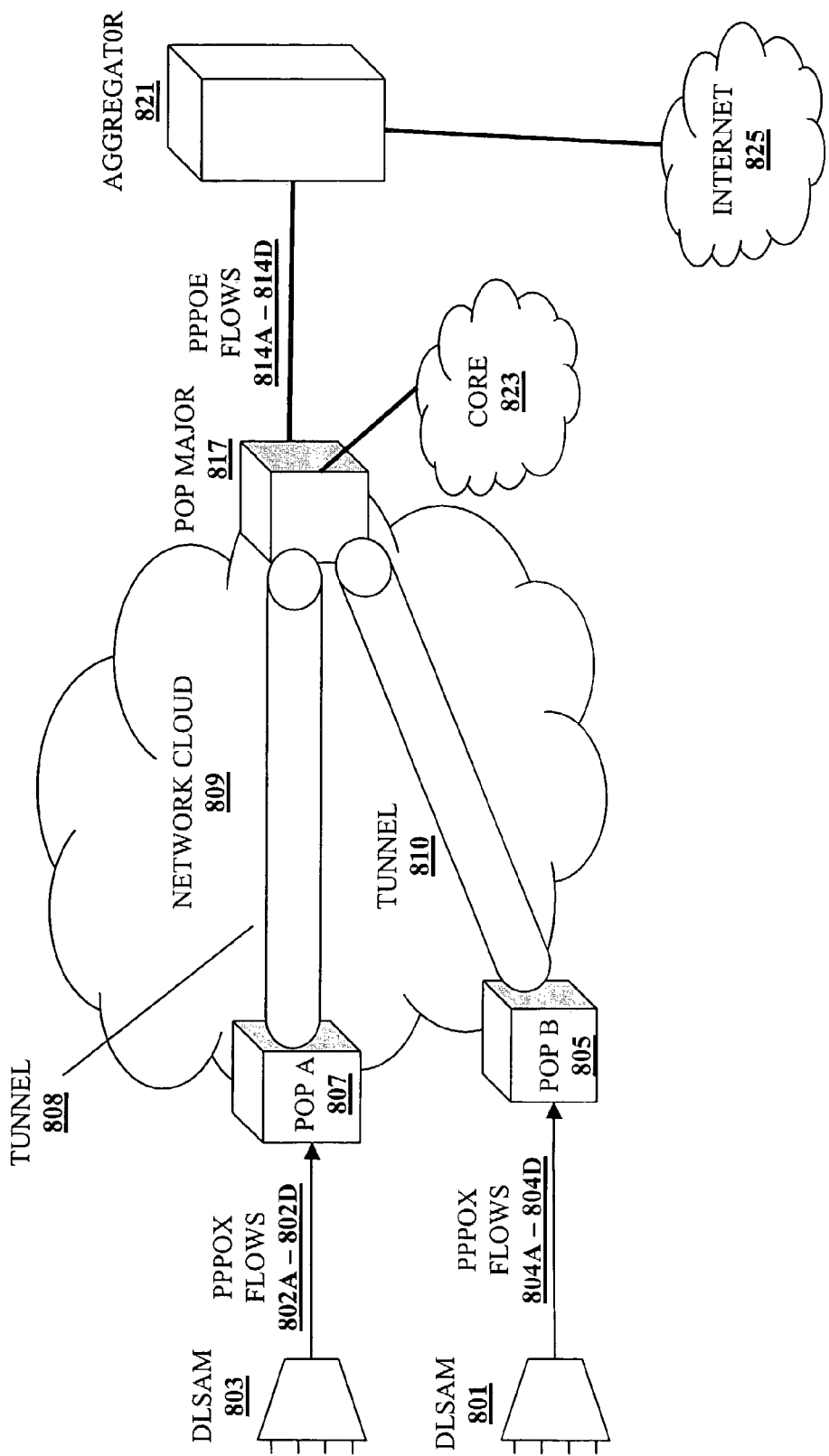
FIG. 8 is a diagram of a distributed edge termination model for a service provider according to one embodiment of the invention.

FIG. 8 is a diagram of a distributed edge termination model for a service provider according to one embodiment of the invention. Agnostic PPPoE switching enables the distributed edge termination model illustrated in FIG. 8. In FIG. 8, a DSLAM 803 transmits PPPoX flows 802A-802D from multiple subscribers to a PoP A 807 of a service provider. A DSLAM 801 transmits PPPoX flows 804A-804D from multiple subscribers to a PoP B 805 of the service provider. It should be understood that the invention is not limited to DSLAMs and that the illustration of FIG. 8 utilizes DSLAMs to aid in the understanding of the invention. For example, cable head ends may receive subscriber traffic. The flows going into the DSLAMs 801 and 803 are both PPPoX flows in this illustration. The described invention could also be illustrated with one of the DSLAMs transmitting PPPoE flows while an other transmits PPPoX flows. In addition, other flows of traffic (e.g., IPoE, PoS, etc.) that are not shown can be transmitted to the PoP A 807 and the PoP B 805.

The PPPoX flows 802A-802D and 804A-804D are respectively terminated at the PoP A 807 and the PoP 805. The PoP A 807 tunnels the PPPoX flows 802A-802D via a tunnel 808 (e.g., MPLS, GRE, IP, L2TP, etc.) through a network cloud 809 (e.g., an IP network, an optical network, an ATM network, etc.) to a PoP Major 817. The PoP B 805 also tunnels the PPPoX flows 804A-804D through the network cloud 809 to the PoP Major 817. The PoP Major 817 is coupled with a core network cloud 823 and an aggregator 821. The PoP Major 817 terminates the tunnels 808 and 810. The PoP Major 817 translates the PPPoX flows from the terminated tunnel 808 and 810 and transmits the PPPoE flows 814A-814D, which includes PPPoE flows and translated PPPoX flows, to the aggregator 821. The aggregator 821 transmits data, including data from the PPPoE flows 814A-814D, and receives data from the Internet 825.

Instead of translating PPPoX flows at the PoP Major 817, an alternative embodiment of the invention provides for translation of PPPoX flows into PPPoE flows at the PoPs terminating flows from DSLAMs. Referring to FIG. 8, the PoP A 807 and the PoP B 805 respectively translate the PPPoX flows 802A-802D and 804A-804D. In another embodiment of the invention, translation of PPPoX flows to PPPoE flows is performed at both the PoPs and the PoP Major. At the PoP Major 817 the tunnels 808 and 801 carrying translated PPPoE flows is cross connected to a relatively inexpensive media to the aggregator 821.

The distributed termination model illustrated in FIG. 8 enables a service provider to concentrate different PPPoX and PPPoE flows onto a single relatively inexpensive media to an aggregator. The distributed termination model illustrated in FIG. 8 also enables relatively more expensive media, such as an ATM network, to the outermost part of a service provider's network.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method in a network element comprising:
receiving link layer traffic encapsulated according to a link layer protocol at a link layer port;
demultiplexing the link layer traffic received via the link layer port into Point to Point Protocol over Ethernet (PPPoE) traffic, PPP over non-Ethernet (PPPoX) traffic, and non-PPP-traffic at a link layer demultiplexer;
forwarding non-PPP traffic received from the link layer demultiplexer using a virtual router coupled with the link layer demultiplexer;
converting PPPoX traffic received from the link layer demultiplexer into PPPoE traffic and converting PPPoE traffic received from a PPPoE multiplexer/demultiplexer into PPPoX traffic using a PPPoX proxy module;

switching PPPoE traffic received from the link layer demultiplexer and from the PPPoE multiplexer/demultiplexer using a PPPoE switch module; and multiplexing PPPoE traffic received from the PPPoE switch module and the PPPoX proxy module using the PPPoE multiplexer/demultiplexer coupled with the PPPoX proxy module and the PPPoE switch module; and demultiplexing PPPoE traffic into different traffic flows according to their session identifier using the PPPoE multiplexer/demultiplexer.

2. A network element comprising:

a link layer port to receive link layer traffic encapsulated according to a link layer protocol;

a link layer demultiplexer to demultiplex link layer traffic received via the link layer port into Point to Point Protocol over Ethernet (PPPoE) traffic, PPP over non-Ethernet (PPPoX) traffic, and non-PPP traffic;

a virtual router coupled with the link layer demultiplexer, to forward non-PPP traffic received from the link layer demultiplexer;

a Point to Point Protocol (PPP) switch module having, a PPPoX proxy module to convert PPPoX traffic received from the link layer demultiplexer into PPPoE traffic and to convert PPPoE traffic received from a PPPoE multiplexer/demultiplexer into PPPoX traffic;

a PPPoE switch module to switch PPPoE traffic received from the link layer demultiplexer and from the PPPoE multiplexer/demultiplexer; and the PPPoE multiplexer/demultiplexer coupled with the PPPoX proxy module and the PPPoE switch module, the PPPoE multiplexer/demultiplexer to multiplex PPPoE traffic received from the PPPoE switch module and the PPPoX proxy module and to demultiplex PPPoE traffic into different traffic flows according to their session identifier.

3. A machine readable storage medium storing machine executable instructions, which when executed by a set of one or more processors, cause said set of processors to perform operations in a network element comprising:

receiving link layer traffic encapsulated according to a link layer protocol at a link layer port;

demultiplexing the link layer traffic received via the link layer port into Point to Point Protocol over Ethernet (PPPoE) traffic, PPP over non-Ethernet (PPPoX) traffic, and non-PPP-traffic at a link layer demultiplexer;

forwarding non-PPP traffic received from the link layer demultiplexer using a virtual router coupled with the link layer demultiplexer;

converting PPPoX traffic received from the link layer demultiplexer into PPPoE traffic and converting PPPoE traffic received from a PPPoE multiplexer/demultiplexer into PPPoX traffic using a PPPoX proxy module;

switching PPPoE traffic received from the link layer demultiplexer and from the PPPoE multiplexer/demultiplexer using a PPPoE switch module; and multiplexing PPPoE traffic received from the PPPoE switch module and the PPPoX proxy module using the PPPoE multiplexer/demultiplexer coupled with the PPPoX proxy module and the PPPoE switch module; and demultiplexing PPPoE traffic into different traffic flows according to their session identifier using the PPPoE multiplexer/demultiplexer.

4. The method of claim 1, wherein the converting is performed by matching an entry in a data structure that provides a PPPoE session identifier for each PPP PDU to be converted.

5. The method of claim 4, wherein the data structure is not created until a proxy module within the network element attempts to create an entry in the data structure.

6. The method of claim 4, wherein the data structure is modified to indicate that a subscriber side flow is active once a PPP session is opened.

7. The method of claim 1, further comprising:

receiving PPP PDUs with the uniform encapsulation at a set of one or more aggregator side ports; and converting the PPP PDUs with the uniform encapsulation back into PPP PDUs encapsulated according to different protocols.

8. The method as in claim 1, wherein the network element is agnostic of the encapsulation of the PPP PDUs to be converted.

9. The network element of claim 2, wherein the PPPoX proxy module is to convert the PPPoX traffic by matching an entry in a data structure that provides a PPPoE session identifier for the PPPoX traffic to be converted.

10. The network element of claim 9, wherein the data structure is not created until the PPPoX proxy module attempts to create an entry in the data structure.

11. The network element of claim 9, wherein the data structure is modified to indicate that the PPPoX traffic is active once a PPP session is opened.

12. The network element as in claim 2, wherein the network element is agnostic of the encapsulation of the PPPoX traffic received at the link layer port.

13. The machine storage medium of claim 3, wherein the uniform encapsulation is PPPoE encapsulation.

14. The machine storage medium of claim 3, wherein the converting is performed by matching an entry in a data structure that provides a PPPoE session identifier for each PPP PDU to be converted.

15. The machine storage medium of claim 14, wherein the data structure is not created until a proxy module within the network element attempts to create an entry in the data structure.

16. The machine storage medium of claim 14, wherein the data structure is modified to indicate that a subscriber side flow is active once a PPP session is opened.

17. The machine storage medium of claim 3 that provides instructions, which when executed by a set of one or more processors, cause said set of processors to perform operations further comprising:

receiving PPP PDUs with the uniform encapsulation at a set of one or more aggregator side ports; and converting the PPP PDUs with the uniform encapsulation back into PPP PDUs encapsulated according to different protocols.

18. The machine storage medium of claim 3, wherein the network element is agnostic of the encapsulation of the PPP PDUs to be converted.

* * * * *